(12) United States Patent
Healy

(10) Patent No.: US 6,804,436 B2
(45) Date of Patent: Oct. 12, 2004

(54) EYE-SAFE OPTICAL FIBER TRANSMITTER UNIT

(75) Inventor: David Healy, Stowmarket (GB)

(73) Assignee: Agilent Technologies, Inc., Palo Alto, CA (US)

( * ) Notice: Subject to any disclaimer, the term of this patent is extended or adjusted under 35 U.S.C. 154(b) by 55 days.

(21) Appl. No.: 10/306,224

(22) Filed: Nov. 29, 2002

(65) Prior Publication Data

US 2003/0118283 A1 Jun. 26, 2003

(30) Foreign Application Priority Data

Nov. 30, 2001 (EP) ............................................. 01310047

(51) Int. Cl.⁷ ................................................ G02B 6/32
(52) U.S. Cl. ............................. 385/33; 385/88; 385/93
(58) Field of Search ......................... 385/33–37, 88–94

(56) References Cited

U.S. PATENT DOCUMENTS 5,315,680 A * 5/1994 Musk et al. ................... 385/88

FOREIGN PATENT DOCUMENTS

| DE | 43 07 986 A1 | 9/1994 |
|---|---|---|
| EP | 0 566 341 A1 | 10/1993 |
| EP | 0 798 582 A2 | 10/1997 |
| EP | 0 831 350 A2 | 3/1998 |
| EP | 0 918 238 A1 | 5/1999 |

* cited by examiner

Primary Examiner—Phan T. H. Palmer

(57) ABSTRACT

An eye-safe optical fiber transmitter unit comprises a laser, an optical port, an optical fiber stub with a fiber core carrying optical radiation emitted by the laser to the optical port. The core is an index-guided core surrounded by cladding. Laser radiation is focussed to a spot on a fiber stub entrance face to increase the coupling efficiency of optical radiation into the fiber core and decrease the radiation coupling efficiency of radiation into the surrounding cladding. The coupling efficiency into the core is a maximum at a particular orientation of the entrance face with respect to a focus axis when the focus spot is on the entrance face. The entrance face is not oriented at this particular orientation, but is angled and/or rotated away from the particular orientation to reduce optical coupling efficiency into the fiber core and cladding.

20 Claims, 3 Drawing Sheets

EYE-SAFE OPTICAL FIBER TRANSMITTER UNIT

FIELD OF INVENTION

The present invention relates to an eye-safe optical fibre transmitter unit, and to a method of producing such an unit.

BACKGROUND ART

Optical devices such as laser transceiver units often have an optical port for receiving and/or transmitting laser light from/into optical fibres, for example as part of an optical communications system. The optical fibre has at its end a connector by which the fibre may be connected and disconnected to the port.

In the case of an optical fibre laser transmitter unit, when the connector is not connected to the port, laser radiation from the port needs to be eye-safe. In many cases, optical communications links operate at near-infrared wavelengths of 1.3 μm and 1.5 μm, which present added risk because such wavelengths are invisible. Applicable eye-safety standards for infra-red laser diode transmitter units are the U.S. Standard CDRH Class 1 and the European Standard IEC 825.

Current laser safety guidelines require that the output power density from an optical port of an optical transmitter unit be limited to a level which is eye-safe when no fibre optic connected is connected to the port. Optical coupling efficiencies from a laser diode into an optical fibre are typically quite low, for example of the order of about 1% to 25%. Even if the amount of laser radiation transmitted by the fibre is eye-safe, the total amount of optical radiation emitted by the laser diode may far exceed the limit of eye-safety. It is therefore necessary either to block unwanted light within the port, or to defocus stray light emitted by the port when no optical connected is connected to the port.

One solution to this problem is disclosed in patent document U.S. Pat. No. 5,315,680, which describes an optical port having a short length of optical fibre, called a "fibre stub" held securely in alignment with a laser diode concealed within an optical transmitter unit. Collimating optics are used to focus the laser light into a single-mode core of the fibre. The fibre stub is typically 5 mm to 6 mm long. Light which is not coupled into the core entered the fibre optic cladding, and is dissipated by multiple reflections and scattering with the core and which the exterior surface of the cladding. Any laser radiation that exists from the cladding in not collimated, and is essentially "defocussed" so that the inherent brightness of such stray radiation is greatly reduced.

In recent years there has been an increasing demand for fibre optic communication links having a bandwidth in excess of 1 GHz, for example up to 10 GHz. One way in which a laser diode can be made to operate at higher data rates is to drive the laser at a higher power. It may be possible to reduce the amount of optical power launched into the core by defocussing a laser beam focussed on the input end of the fibre stub, that is, by axially offsetting the laser beam waist with respect to the entrance face of the fibre optic core. Such a technique may also be used to vary (i.e. reduce) the amount of optical power in the core depending on product specifications and the requirements of various applications. The core diameter is, however, much smaller than that of the cladding, and so more defocussed light will be launched into the cladding. Thus, there will still be more total laser power launched into both the core and the cladding of the fibre stub, to the point where light emitted by the fibre core and/or stub is no longer eye-safe.

Another problem with using the defocus technique is that the amount of laser power entering the core then becomes more sensitive to changes in the relative orientation along the light transmission direction, of the fibre stub, the laser and any intervening collimating optics. Such orientations can change owing to thermal expansion of components forming the optical transmitter unit, or because of ageing-induced creep of the materials and adhesives used in the construction of the unit.

One way to reduce the laser power emitted at the end of the fibre stub is to increase the length of the stub in order to increase scattering and absorption over the length of the stub. Cladding modes within a length of optical fibre between about 100 mm and 200 mm long will be substantially dissipated. This, however, results in an increase in the size of the optical transmitter module, which is undesirable.

Another solution is to incorporate an aperture at the end of the stub, for example by means of an absorbing ring around the outside of the fibre core. The aperture, however, must be formed in close alignment with the core, which is of the order of about 10 μm in diameter. This results in additional process steps, which add cost and complexity to the optical transmitter unit.

It is an object of the present invention to provide a more convenient eye-safe optical transmitter unit, and a method for manufacturing such a unit.

SUMMARY OF THE INVENTION

Accordingly, one aspect of the present invention provides an optical transmitter unit comprising a laser diode for emitting optical radiation. A optical fibre stub has a fibre core for carrying said optical radiation and surrounded by a cladding. The optical fibre stub is disposed in a ferrule. Focussing optics focusses said optical radiation from the laser diode into an entrance face of the fibre stub. The focussing optics focusses the optical radiation along a focus axis to a focus spot on the entrance face of the fibre stub, wherein the entrance face is at a particular orientation with respect to said focus axis The ferrule is rotatable in a manner which alters the particular orientation of the entrance face with respect to said focus axis, thereby affecting the efficiency of coupling said optical radiation into the fibre core and cladding.

Another aspect of the invention also provides an optical transmitter unit comprising a laser diode for emitting optical radiation. An optical port is connected to an optical fibre transmission link. An optical fibre stub with a fibre core carries the optical radiation to the optical port. The core is an index-guided core surrounded by cladding. Focussing optics focusses said optical radiation from the laser diode into an entrance face of the fibre stub. The focussing optics focusses the optical radiation along a focus axis to a focus spot on the entrance face of the fibre stub to increase the coupling efficiency of optical radiation into the fibre core and to decrease the coupling efficiency of optical radiation into the surrounding cladding. The coupling efficiency into the core is a maximum at a particular orientation of the entrance face with respect to the focus axis when the focus spot is on the entrance face. The entrance face is not oriented at the particular orientation, but is angled and/or rotated away from the particular orientation in order to reduce the coupling efficiency of the optical radiation into the fibre core and cladding.

Also according to another aspect of the invention there is provided a method of assembling an optical transmitter unit including a laser diode for emitting optical radiation, an optical port for connection to an optical fibre transmission link, an optical fibre stub with a fibre core for carrying the optical radiation to the optical port. The core is an index-guided core surrounded by cladding. Focussing optics focusses the optical radiation from the laser diode into an entrance face of the fibre stub. The method comprises the steps of:

i) using the focussing optics to focus the optical radiation along a focus axis to a focus spot on the entrance face of the fibre stub in order to increase the coupling efficiency of optical radiation into the fibre core and to decrease the coupling efficiency of optical radiation into the surrounding ii) orienting the entrance face with respect to the focus axis to a particular orientation in order to maximise the coupling efficiency into the fibre core when the focus spot is on the entrance face; and then iii) changing the orientation of the entrance face with respect to the focus axis away from the particular orientation by angling and/or rotating the entrance face with respect to the focus axis in order to reduce the coupling efficiency of the optical radiation into the fibre core and cladding.

By reducing the coupling efficiency of coupling optical radiation into the fibre stub, the amount of optical radiation emitted by the transceiver unit when no optical transmission link is connected to the transmitter unit can be reduced, and so made eye-safe. At the same time, by focussing the optical radiation onto the entrance face of the fibre stub, the proportion of optical radiation in launched into the index-guided core with respect to the cladding, is increased, so increasing the useful proportion of optical radiation transmitted by the optical transmitter unit, compared with wasted optical radiation in the cladding.

One way in which the relative orientation of the entrance face and the focus axis can be set in order to reduce the coupling efficiency is to adjust and set the angle of the entrance face with respect to the focus axis at a non-normal angle. Unwanted optical radiation will then be reflected by the entrance face, rather than admitted and transmitted within the fibre stub.

Apart from the optical port, the optical transceiver unit is preferably light-tight so that such stray reflections within the unit are ultimately absorbed.

The entrance face of the fibre stub may include a polarising element, for example a polarising isolator for suppressing back-reflection of the optical radiation into the laser diode. Such an isolator may be adhered onto an input facet of the fibre stub within the optical transceiver.

The polarising element, whether or not the element is also an isolator, may also be set at an angle or orientation at which said polarising element reduces the coupling efficiency. This can be done by rotating the polariser about the focus axis to an orientation at which the polariser admits a reduced amount of optical radiation into the fibre stub. The polariser then absorbs an increased amount of optical radiation prior to transmission of said optical radiation to the optical port by the fibre stub.

In a preferred embodiment of the invention, the focussing optics have an optical axis that is offset to the projection axis of the optical radiation from the laser diode, and the optical fibre stub has a transmission axis that is angled to a focus axis for optical radiation focussed onto the entrance face of the fibre stub. The entrance face is therefore oblique, that is, angled at a non-right angle, to the transmission axis of the optical fibre stub in order to maximise coupled optical radiation into the optical fibre stub at an optimal orientation between the entrance face of the optical fibre stub and said focussed optical radiation. The optical radiation coupled into the fibre core is then reduced by rotating the optical fibre about the transmission axis whilst otherwise maintaining the orientation between the optical fibre stub and the focussing optics.

By changing the angle and/or rotation as described above, it is possible to vary the coupling efficiency over a range whereby the amount of optical radiation coupled into the fibre core is reduced by at least 10%, and up to 90%, from the maximum coupling efficiency at said particular orientation.

The invention will now be described in further detail, and by way of example only with reference to the drawing.

DETAILED DESCRIPTION OF THE DRAWING

Figure 1:
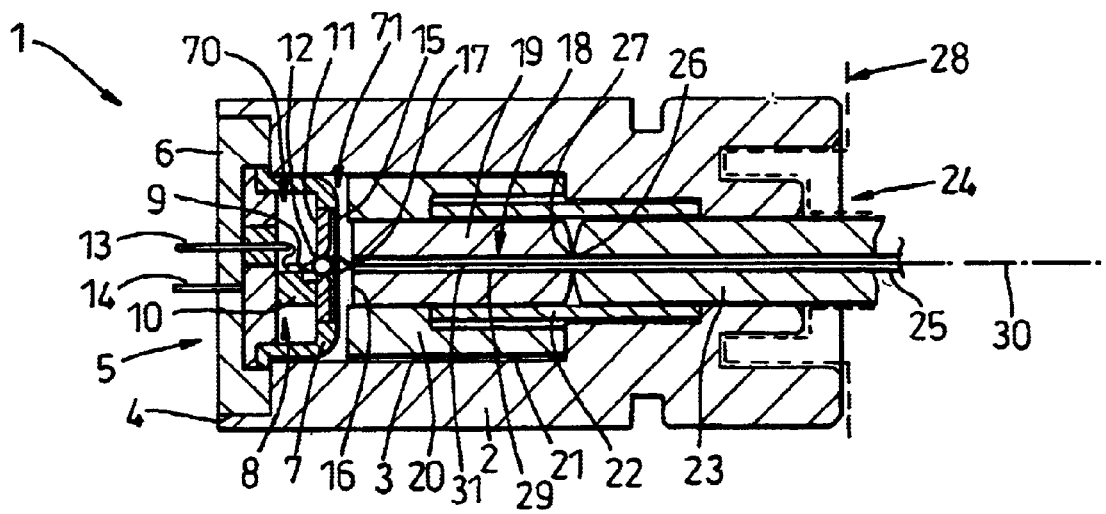
FIG. 1 is a cross-section of an optical transmitter unit according to one aspect of the invention, wherein a laser diode and focussing optics launch optical radiation into a fibre stub in such a way that the coupling efficiency of optical radiation into the fibre core and cladding is reduced by angling an entrance face of the fibre stub with respect to a focus axis.

FIG. 1 is a schematic diagram of an optical transmitter unit 1 according to the invention, not to scale, having a body 2 with a multiply-stepped axial bore 3. At one end 4 of the bore 3 is mounted a laser transmitter module 5 secured to the body 2, for example by an organic adhesive (not shown).

The transmitter module 5 comprises a base plate 6 (also referred to as a "header"), which together with a metal can 7 forms a sealed enclosure 8 housing a laser diode 9 mounted on a heat sink 10. Secured to the can 7 is a mount 11 holding a spherical lens 12 which collimates optical radiation output from the laser diode 9.

Electrical connections to the laser diode are via contact pins 13,14 which project from the base plate 6.

A collimating lens 12 forms an aperture in the laser module 5 from which light is focused through a transparent window 15 towards an entrance face 17 of an optical fibre stub 18 securely held within a cylindrical ceramic ferrule 19. The optical fibre stub 18 includes an index-guided fibre having a single-mode core 31 surrounded by cladding 29.

The body 2 and can 7 together form a housing 2,7 that is divided into parts by the focussing optics 12, including a first part 70 encompassing the laser diode 9 and a second part 71 encompassing the entrance face 17 of the optical fibre stub 18. The division between the first part 71 and the second part 72 of the housing 2,7 helps to prevent uncoupled optical radiation in the second part 71 of the housing from reaching the first part 70 of the housing.

The optical fibre stub 18 and surrounding ferrule 19 are typically less than or about 10 mm long. The ferrule 19 is itself held in place by a ferrule holder 20 which makes a push fit with a part 21 of the stepped bore 3 and, in addition, is secured in place by means of adhesive.

A fibre optic connector 28, part of which is shown in phantom outline, has a projecting connector ferrule 23, which can be removably plugged, into an optical port 24 in the form of an open end of the body 2.

Fitted about the ceramic ferrule 19 within the body 2 is a split ferrule 22, which is arranged to centre and lightly clamp the connector ferrule 23 when the fibre optic connector 28 is connected to the fibre optic transmission unit.

The connector ferrule 23 holds a transmission optical fibre 25, one end 26 of which is brought into a co-linear alignment with an external end 27 of the optical fibre stub 18, so that the optical radiation which is focussed into the stub 18, is coupled for onward transmission by the transmission fibre 25.

The ceramic ferrule 19 within the body 2 has an end 16 facing the laser transmitter module 5 which, together with the end 17 of optical fibre stub 18 is set at a non-normal angle to a transmission axis 30 of the optical fibres 18,25. As will be explained in more detail below, the arrangement is such that the overall coupling efficiency of optical radiation into the optical fibre stub 18 is reduced, while at the same time coupling efficiency into the single-mode core 31 of the fibre stub 18 is made compensatingly higher, and the coupling efficiency into the cladding 29 is made correspondingly lower. This is done so that the laser diode 9 can be operated at a higher optical power level for higher data rate transmission, while at the same time keeping the light output from the open end 24 of the body 2 from both core 31 and cladding 29 to an eye-safe level when no optical fibre connector 28 is joined to the optical transmitter unit 1.

Figure 2:
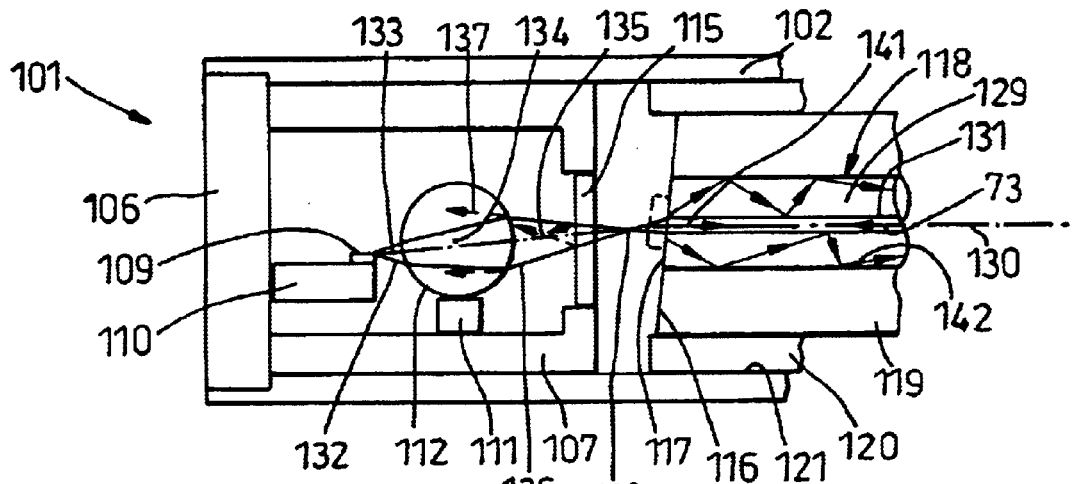
FIGS. 2 to 4 are schematic drawings of a prior art optical transmitter unit similar to that of FIG. 1, in which the optical fibre stub is angled and rotated to maximise optical coupling efficiency into the fibre, while at the same time reducing coupling efficiency into the fibre core by defocusing the laser beam waist with respect to the fibre core.
Figure 3:
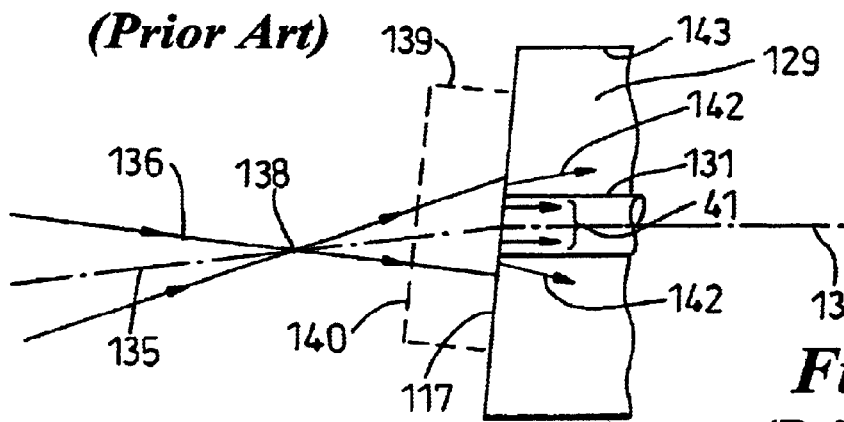

Reference is now made to FIGS. 2 and 3, schematic drawings of a prior art optical transmitter unit 101 similar to that of FIG. 1, in which components similar to those of the optical transmitter unit 1 are indicated by reference numerals incremented by 100. Optical radiation 132 is emitted by the laser diode 109 along an optical axis 133 towards a spherical focusing lens 112. The optical axis 133 is offset with respect to a centre point 134 of the lens 112 so that the optical axis 135 of optical radiation 136 focussed by the lens 112 is at an angle to the optical axis 133 of the laser diode 109. The main reason for the off-axis focusing arrangement is so that back reflections 137 from optical components 112,115,118 do not feed back into the laser diode 109. A consequence of this is that the entry face 117 of the optical fibre stub 118 is at a non-normal angle to the optical axis 135 of light focused towards the optical fibre stub 118 from the spherical lens 112.

In optical diode transmission systems where high data rate is needed, for example between 1 GHz and 10 GHz, the laser diode 109 is run at higher optical powers in order to achieve faster rise and fall times in the optical signal. In order to keep the amount of optical radiation emitted from the fibre stub 118 at an eye-safe level, the optical radiation 136 projected towards the fibre 118 is defocused so that this comes to a focus at a beam waist 138 in advance of the entry face 117 of the optical fibre stub 118. Optionally, a polarising isolator element 139 may be affixed to the fibre 118, in which case the entry face 140 of the polarising element 139 is the effective entry face for the optical fibre stub 118. Such isolators use circular polarisation together with a quarter-wave plate (not shown) to reduce or stop back-reflections 73 transmitted down the fibre stub 118 reaching the laser diode 9. However, because such isolators 139 are relatively expensive, they are not used in applications where such isolation is not necessary.

Although defocusing of the focused radiation 136 has the effect of reducing the optical power 141 launched into the single-mode core 131 of the optical fibre stub 118, this does have the effect of launching relatively more optical radiation 142 into the fibre cladding 129.

Optical radiation 142 launched into the cladding 129 will gradually be dissipated by irregular reflections and scattering by the core 131 and external surface 143 of the cladding. However, a relatively short fibre stub 118 of the order of about 10 mm may not sufficiently attenuate unwanted stray optical radiation 142 to an eye-safe level at the output recess of the optical transmission unit 101. Although the length of the fibre stub 118 could, in principle, be increased to reduce the level of stray optical radiation 142, in practice this would require an optical stub up to 300 mm in length, which is impractically large for commercial optical transmission units 101, which need to be compact.

Various solutions have been proposed to this problem, such as roughening the outer surface 143 of the cladding 129, or incorporating optical absorbing or blocking structures into the cladding such as annular grooves filled with optically absorbing material, or opaque masks on an output face of the cladding at the external end 27 of the stub. These are additional, inconvenient process steps in the formation of a laser transmitted unit, requiring precision etching or masking of the fibre stub 118.

Figure 4:
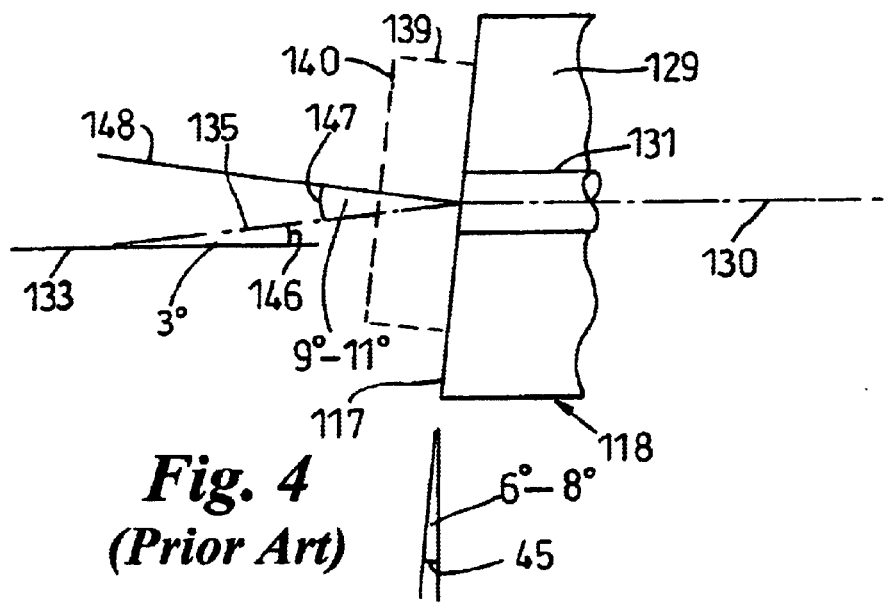

FIG. 4 is an illustration of the orientation of fibre entrance face surfaces 117,140 with respect to the focus axis 135 and fibre transmission axis 130. When the fibre entrance face 117,140 is at an angle of between about 6° to 8°, then the amount of optical radiation 141 coupled into the optical fibre core 131 is maximised when the focus axis 135 is at an angle of 3° to a line parallel to the fibre transmission axis 130, and at an angle 147 of between about 9° to 11° to a normal 148 to the fibre entrance face 117,140.

Figure 5:
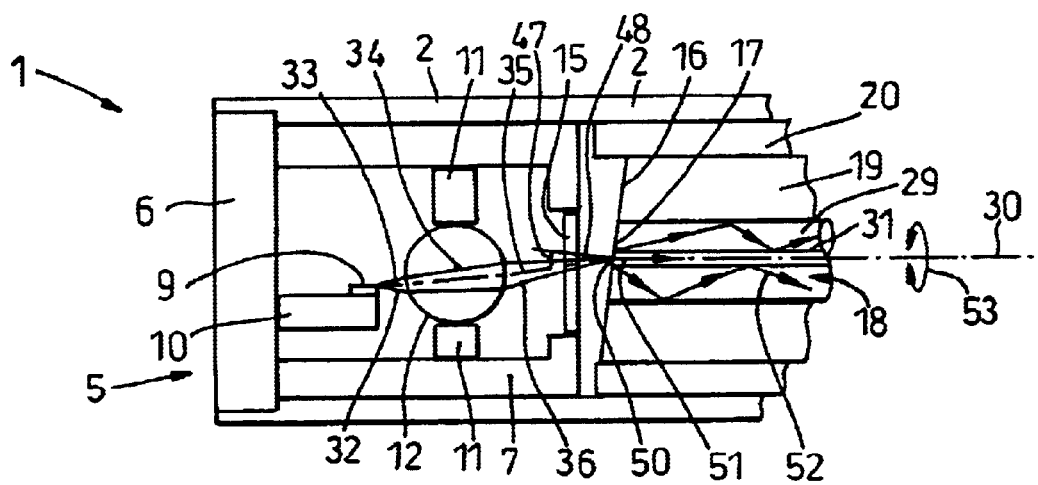
FIGS. 5 and 6 are schematic drawings of the optical transmitter unit of FIG. 1, wherein the coupling efficiency of optical radiation into the fibre core is first maximised by first aligning the fibre core with respect to the laser beam waist, and then rotating the fibre to reduce this coupling efficiency.
Figure 6:
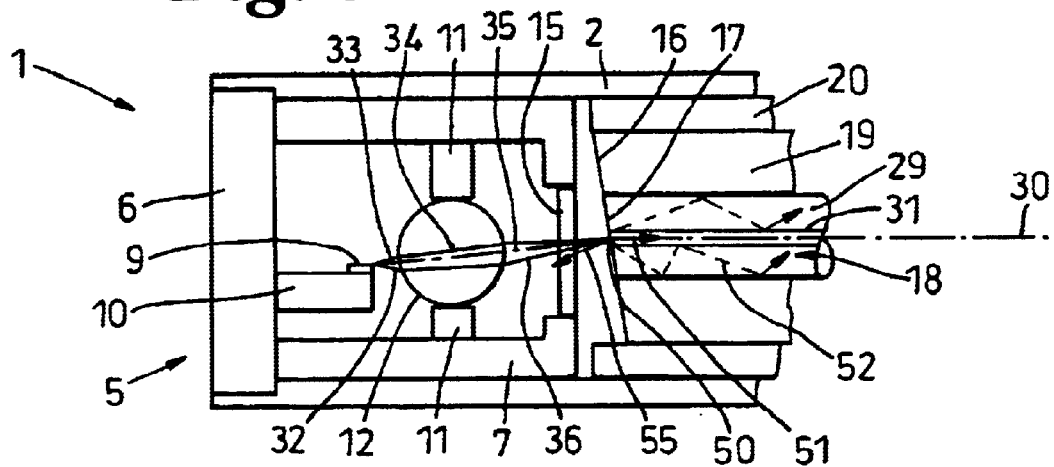

FIGS. 5 and 6 are schematic diagrams of the alignment steps used in making the optical transmission unit 1 of FIG. 1. The optical arrangement is initially set up as shown in FIG. 5, in a manner similar to that described above for FIG. 2, with the exception that the focused optical radiation 36 is brought to a focus spot 50, preferably a Gaussian beam waist, on an entry face 17 of the optical fibre stub 18 in order to couple the maximum amount of optical radiation 51 into the fibre core 31, and to minimise the amount of optical radiation 52 launched into the cladding 29. At this stage, the amount of optical radiation emitted from the open end 24 of the body 2 will be beyond eye-safe levels at the optical powers required for high data rate transmission.

Because the optical fibre stub 18 is securely bonded within the ceramic ferrule 19, any change to the orientation of the ferrule 19 will have a corresponding change on the orientation of the fibre stub 18. The fibre 18 and surrounding ferrule 19 are cylindrically symmetric, so that a rotation of the ferrule does not significantly change the orientation of the core 31 at the entry face 17 with respect to the focus spot 50.

The ceramic ferrule 19 is then rotated 53 about the fibre transmission axis 30, in order to change the input coupling angle 47 with respect to the focus axis 35, while at the same time maintaining the beam waist 50 on the fibre entry face 17 at the fibre core 31. It may be necessary to realign the focus spot 50 during this procedure to keep this focussed on the entry face 17 of the fibre core 31. This rotation 53 has the effect of increasing back-reflected optical radiation 55 from the fibre entry face 17, so reducing the coupling efficiency of optical radiation 51,52 both into the fibre core 31 and fibre cladding 29. If the ceramic ferrule 19 and optical fibre stub 18 are rotated fully by 180° as shown in FIG. 6, then there will be a maximum reduction in the coupling efficiency of optical radiation 51,52 into the optical fibre stub 18. In general, however, it may not be necessary to minimise the coupling efficiency to achieve eye-safety, and so the rotation 53 of the ferrule 19 and optical fibre stub 18 will, in general, be less than 180°. The main benefits of the invention will become apparent when the coupling efficiency has been reduced by at least about 10% from the maximum as shown in FIG. 5.

Figure 7:
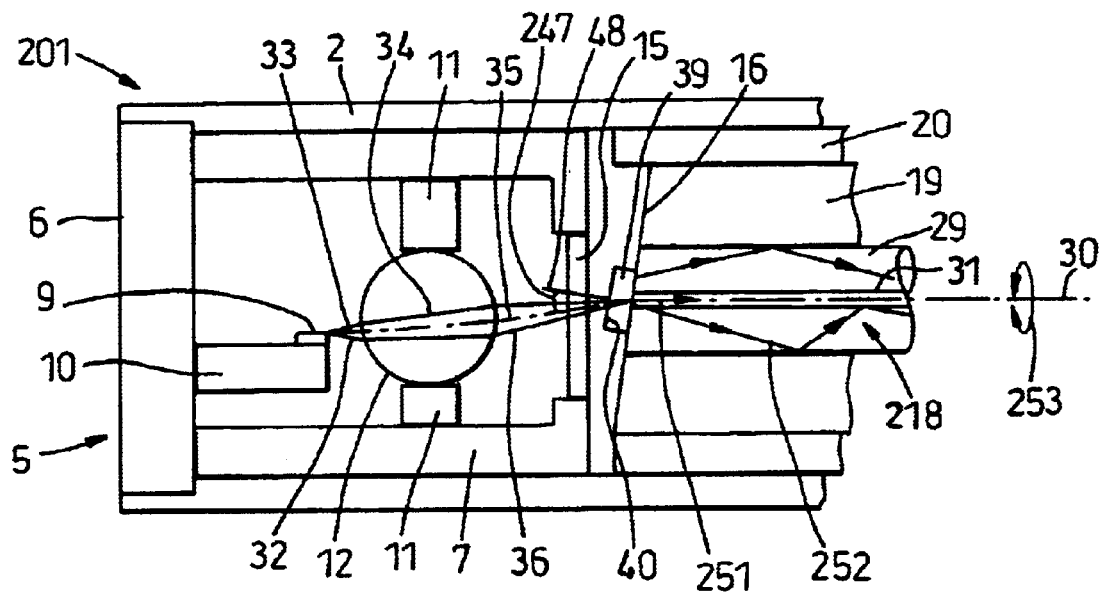
FIGS. 7 and 8 are schematic drawings of a second embodiment of an optical transmitter unit according to the invention, showing how use of a polarising filter can help in reducing the optical coupling efficiency into the optical fibre stub.
Figure 8:
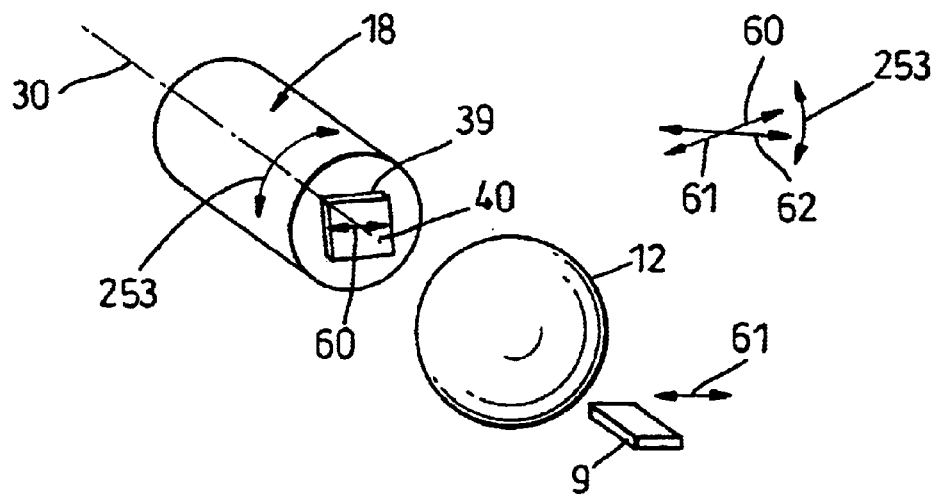

A second embodiment of an optical transmitter unit 201 is shown schematically in FIGS. 7 and 8. This embodiment is the same as that illustrated in FIGS. 1, 5 and 6 with the exception that the optical fibre stub 218 includes an adhered polarising element 39. The polarising element 39 may be a circular polarising isolator if this is required, but in the present example is a less expensive linear polarising element.

When the ceramic ferrule 19 and optical fibre stub 218 are initially orientated for maximum optical coupling efficiency as shown in FIG. 5, the polarising element 39 is initially orientated with a linear polarising axis 60 parallel to the polarisation direction 61 of optical radiation 32 emitted by the laser diode 9. Then, as the ceramic ferrule 19 and optical fibre stub 218 are rotated 253 about the transmission axis 30 in order to change the input coupling angle 247 with respect to the focus axis 35, the efficiency of optical radiation 251,252 coupled into the fibre core 31 and cladding 29 will be synergistically reduced both by the change in relative orientation 62 between the polarising axis 60 and polarisation direction 61, and also by the reduced coupling efficiency owing to the non-optimal changes to the input coupling angle 47,247 for focused optical radiation 36 incident on an entry face 40 of the polarising element 39.

Once the desired reduction in coupling efficiency into the optical fibre stub 218 has been achieved, the orientation between the ceramic ferrule 19 and body 2 can be set, for example by an adhesive (not shown).

The invention provides a number of benefits. First, the optical power in a fibre core 31 delivered at the output 24 of a fibre stub 18,218, can be varied according to the needs of the application, without breaching a maximum allowable total amount of optical power coupled into the cladding 29 and core 31.

Laser diodes can be driven to the high optical powers demanded by many high data rate applications, while limiting the total optical power emitted by the output of the transmitter unit to an eye-safe level.

Since the fibre stub and surrounding ferrule are always aligned such that the beam waist is positioned in the centre of the core entrance face, variations in coupled power resulting from mechanical changes in the assembly, for example those caused by thermal or ageing effects, or the stub fixing process, are less pronounced and make the optical performance of the assembly more stable.

It is also possible to use a single standard arrangement of components which can be aligned to achieve a wide range of launch powers without any change in the dimensions of such components. This is a significant advantage in comparison with the prior art approach, which is to set an optical power within a desired range by changing the separation distance between the input face of the fibre stub and lens, which can lead to a large variation in the length of such an assembly.

When combined with a linear polariser on the fibre stub, the invention provides a greater range of possible launch powers.

The invention also requires no apertures or other light-blocking structures on the fibre cladding.

The optical transmitter units according to the invention 1,201 described above conform to the US Standard CDRH Class 1 or the European Standard IEC 825, as regards the emitted radiance from the unit with no optical transmitter link 28 connected to the optical port 24. The invention requires no special modifications to the fibre stub 18 to absorb or block unwanted optical radiation in the cladding 29. The process steps used in the formation of the transmitter unit do not require additional processing equipment. The invention therefore provides a convenient way to achieve higher laser operating powers, required by high data rate applications, while at the same time helping to limit the total optical power emitted by the optical transmitter unit to an eye-safe level.

What is claimed is:

1. An optical transmitter unit, comprising a laser diode for emitting optical radiation, an optical fibre stub having a fibre core for carrying said optical radiation and being surrounded by a cladding, said optical fibre stub being disposed in a ferrule, and focussing optics for focussing said optical radiation from the laser diode into an entrance face of the fibre stud, the focussing optics being arranged to focus the optical radiation along a focus axis to a focus spot on the entrance face of the fibre stub, said entrance face being at a particular orientation with respect to said focus axis; and said ferrule being rotatable in a manner for altering said particular orientation of said entrance face with respect to said focus axis, thereby affecting the efficiency of coupling said optical radiation into said fibre core and cladding.

2. An optical transmitter unit as claimed in claim 1, in entrance face is angled at a non-normal angle to said focus axis.

3. An optical transmitter unit as claimed in claim 1, in which the entrance face of the fibre stub is a face of a linear polarising element with a polarisation axis set at an angle to a linear polarising direction of the focussed optical radiation in order to reduce the coupling efficiency of said optical radiation into the fibre core and cladding.

4. An optical transmitter unit as claimed in claim 1, in which the optical coupling efficiency into the fibre core is reduced by at least 10% from the maximum coupling efficiency at said particular orientation.

5. An optical transmitter unit as claimed in claim 1, in which the emitted radiance from the unit with no optical transmitter link connected to the optical port conforms to at least one of the US Standard CDRH Class 1 and the European Standard IEC 825.

6. An optical transmitter unit as claimed in claim 1, in which the fibre stub is less than 10 mm long.

7. An optical transmitter unit as claimed in claim 1, in which the transmitter unit includes a housing, said housing encompassing the laser diode, focussing optics and entrance face of the optical fibre stub, wherein the housing is divided into parts by the focussing optics including a first part encompassing the laser diode and a second part encompassing the entrance face of the optical fibre stub, wherein the civilian between the first part and the second part of the housing helps to prevent uncoupled optical radiation in the second part of the housing from reaching the first cart of the housing.

8. An optical transmitter unit an claimed in claim 1, in which said focus spot is a beam waist.

9. An optical transmitter unit, comprising a laser diode for emitting optical radiation, an optical port for connection to an optical fibre transmission link, an optical fibre stub with a fibre core for carrying said optical radiation to the optical port, said core being an index-guided core surrounded by cladding, and focussing optics for focussing said optical radiation from the laser diode into an entrance face of the fibre stub, the focussing optics being arranged for focussing the optical radiation along a focus axis to a focus spot on the entrance face of the fibre stub in order to increase the coupling efficiency of optical radiation into the fibre core and to decrease the coupling efficiency of optical radiation into the surrounding cladding, said coupling efficiency into the core being a maximum at a particular orientation of the entrance face with respect to the focus axis when the focus spot is on the entrance face; and the entrance face being oriented so it is not at said particular orientation, but is at least one of angled and rotated away from said particular orientation in order to reduce the efficiency of coupling said optical radiation into the fibre core and cladding.

10. An optical transmitter unit as claimed in claim 2, in which the entrance face is angled at a non-normal angle to said focus axis.

11. An optical transmitter unit as claimed in claim 9, in which the entrance face of the fibre stub is a face of a linear polarizing element with a polarisation axis set at an angle to a linear polarizing direction of the foccussed optical radiation in order to reduce the coupling efficiency of said optical radiation into the fibre core and cladding.

12. An optical transmitter unit as claimed in claim 9, in which the optical coupling efficiency into the fibre core is reduced by at least 10% from the maximum coupling efficiency at said particular orientation.

13. An optical transmitter unit as claimed in claim 9, in which the emitted radiance from the unit with no optical transmitter link connected to the optical port conforms to at least one of the US Standard CDRH Class 1 and the European Standard IEC 825.

14. An optical transmitter unit as claimed in claim 9, in which the fibre stub is less than 10 mm long.

15. An optical transmitter unit as claimed in claim 9, in which the transmitter unit includes a housing, said housing encompassing the laser diode, focussing optics and entrance face of the optical fibre stub, wherein the housing is divided into parts by the focussing optics including a first part encompassing the laser diode and a second part encompassing the entrance face of the optical fibre stub, wherein the division between the first part and the second part of the housing helps to prevent uncoupled optical radiation in the second part of the housing from reaching the first part of the housing.

16. An optical transmitter unit as claimed in claim 9, in which said focus spot is a beam waist.

17. A method of assembling an optical transmitter unit, including a laser diode for emitting optical radiation, an optical port for connection to an optical fibre transmission link, an optical fibre stub with a fibre core for carrying said optical radiation to the optical port, said core being an index-guided core surrounded by cladding, and focussing optics for focussing said optical radiation, from the laser diode into an entrance face of the fibre stub, the method comprising the steps of:

i) using the focussing optics to focus the optical radiation along a focus axis to a focus spot on the entrance face of the fibre stub in order to increase the coupling efficiency of optical radiation into the fibre core and to decrease the coupling efficiency of optical radiation into the surrounding cladding;

ii) orienting the entrance face with respect to the focus axis to a particular orientation in order to maximise said coupling efficiency into the fibre core when the focus spot is on the entrance face; and then iii) changing the orientation of the entrance face with respect to the focus axis away from said particular orientation by at least one of angling and rotating the entrance face with respect to the focus axis in order to reduce the coupling efficiency of coupling said optical, radiation into the fibre core and cladding.

18. A method as claimed in claim 17, in which step iii) includes adjusting the angle of the entrance face with respect to the focus axis to a non-normal angle when the entrance face is oriented to reduce the optical coupling efficiency.

19. A method as claimed in claim 17, in which the entrance face of the fibre stub is a face of a linear polarising element, and step iii) includes rotating the entrance face with respect to the focus axis in order to increase absorption of incident optical radiation by the polarising element prior to transmission of said optical radiation to the optical port by the fibre stub.

20. A method as claimed in claim 17, in which the focussing optics have a focus axis that is offset to a projection axis of the optical radiation from the laser diode, and the optical fibre stub has a transmission axis that is angled to the focus axis for optical radiation focussed onto the entrance face of the fibre stub, said entrance face therefore being oblique to the transmission axis of the optical fibre stub in order to maximise coupled optical radiation into the optical fibre stub at an optimal orientation between the entrance face of the optical fibre stub and said focussed optical, radiation, step iii) including rotating the optical fibre stub about the transmission axis whilst otherwise maintaining the orientation between the optical fibre stub and the focussing optics.

* * * * *